(No Model.)
W. ANDERSON.
APPARATUS FOR PURIFYING WATER.
No. 464,669. Patented Dec. 8, 1891.
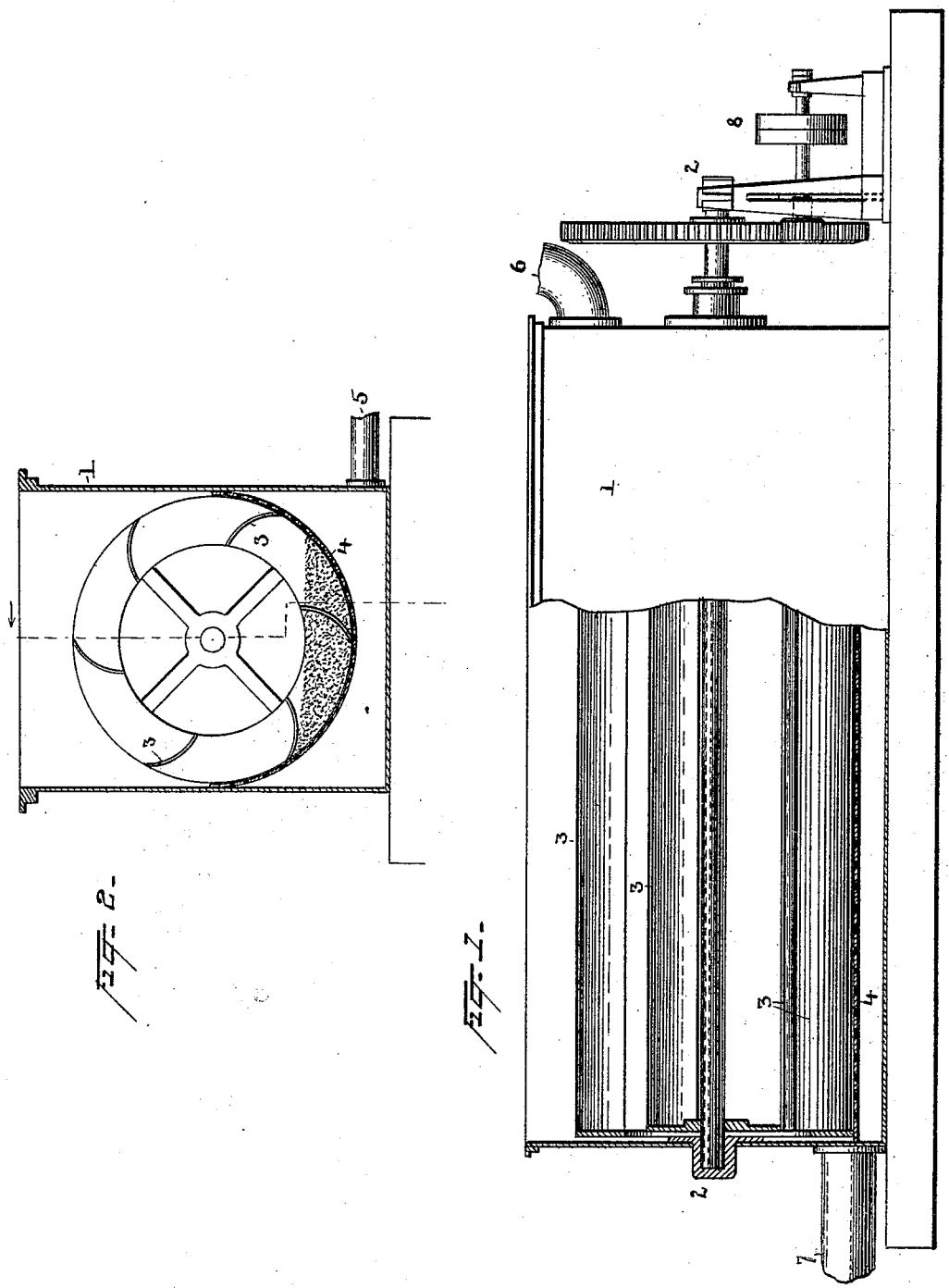
Witnesses
Inventor
W. Anderson,
By his Attorneys
Dyer & Seely.

United States Patent Office.

WILLIAM ANDERSON, OF ERITH, COUNTY OF KENT, ENGLAND, ASSIGNOR TO THE REVOLVING PURIFIER COMPANY, LIMITED, OF LONDON, ENGLAND.

APPARATUS FOR PURIFYING WATER.

SPECIFICATION forming part of Letters Patent No. 464,669, dated December 8, 1891.

Original application filed February 28, 1890, Serial No. 342,135. Divided and this application filed March 5, 1891. Serial No. 383,851. (No model.)

*To all whom it may concern:*

Be it known that I, WILLIAM ANDERSON, a subject of the Queen of Great Britain, residing at Erith, county of Kent, England, have invented a certain new and useful Improvement in Apparatus for Purifying Water, (Case F,) (this application being a division of my application, Serial No. 342,135, filed February 28, 1890,) of which the following is a specification.

The object of the present invention is to produce an apparatus whereby water containing a hurtful amount of animal or vegetable material or other impurities may be made clear and healthful with a minimum expenditure of time and expense.

It has long been known that certain materials, such as metallic iron, if brought into contact with water, had the effect of purifying the same by a chemical action on the impurities contained therein. The method of producing this contact has been to use large masses of spongy iron or other chemically-acting material, through which the water was made to pass. This, however, is found an imperfect method, since, after a short use, the mass becomes clogged and it becomes necessary to break it up mechanically or to remove it and to replace it by fresh material. In the present apparatus I use either spongy iron or, preferably, filings, scraps, or pellets of metallic iron. This comminuted material is not held in a mass, as a filter, but is constantly or repeatedly showered through the water in such manner that the particles are kept clean by rubbing against each other and are brought into intimate contact with the water. After the water is thus treated with the iron it is preferably led to settling-tanks and then to suitable sand or other filters.

In the accompanying drawings, illustrating the invention, Figure 1 shows a side elevation, partly in section, of my purifier; and Fig. 2 is a cross-section of the same.

Supported on a suitable base is a stationary tank 1, preferably open at the top, adapted to hold water. Passing through the tank and having trunnions at 2 2 is a shaft, which carries a cylindrical structure with buckets, scoops, or shelves 3 at intervals around its periphery. The tank is provided at a short distance above its bottom with a perforated plate 4, preferably of metal, curved to correspond in shape to the revolving cylindrical structure. Upon this plate is placed a small quantity of the purifying material, preferably about enough to fill the curved bottom one-third full. A pipe 5 leads to the space under the curved bottom, through which air or gas under pressure may be admitted to aerate the water.

6 is a water-inlet, and 7 a water-outlet.

In using the apparatus water is admitted at 6 and leaves at 7. Power is applied at pulley 8, whereby through suitable gearing the cylindrical structure is caused to revolve. This movement raises the iron in the buckets or pockets 3 and showers it down through the water, as clearly indicated in the drawings. The cylindrical structure is made open or in the form of a skeleton frame, so that the iron raised by the shelves and then showered down therefrom may fall again to the curved bottom 4, thereby passing through a large part of the water in the tank. In this manner the iron is kept loose and clean and is brought into intimate contact with the water. The flow of water should be so regulated that the water will remain in the purifier from three to six minutes, the length of contact being determined by the nature of the water being purified.

In treating some waters it will not be found necessary to introduce air through pipe 5, since sufficient air will come in contact with the water at the open top of the tank. It will be evident that the position of the water inlet and outlet pipes can be changed without affecting the merits of the apparatus.

The apparatus above described constitutes an improvement or modification of the purifier described in my patent, No. 322,148, July 14, 1885, in which the tank or cylinder which holds the water and iron revolves.

Having thus described my invention, what I claim is—

1. The combination, in a water-purifier, of a stationary tank or vessel adapted to hold water to be purified and containing iron particles, and means for raising the iron and showering it through the water in said stationary tank, substantially as described.

2. The combination, in a water-purifier, of a stationary tank or vessel adapted to hold water and containing iron or similar water-purifying particles, having a water-inlet at one end and a water-outlet at the opposite end, and means for raising the particles and showering them through the water in said stationary tank, substantially as described.

3. The combination, in a water-purifier, of a stationary tank or vessel adapted to hold water and containing iron particles, and a revolving device having scoops or shelves for raising the iron and showering it through water in said stationary tank, said revolving device being made open, so that the iron can fall to the bottom of the tank, substantially as described.

4. The combination, in a water-purifier, of a stationary tank or vessel through which water to be purified is passed and containing iron particles, means for raising the iron and showering it through water in the tank, and an air or gas pipe for aerating the water, substantially as described.

5. The combination, in a water-purifier, of a stationary tank or vessel through which water to be purified is passed and containing iron or similar purifying particles, means for raising the iron and showering it through water in the tank, a perforated bottom, and a pipe leading to the space below said bottom for introducing air or gas, substantially as described.

6. The combination of a tank open at the top, adapted to contain water and containing iron or other particles, a revolving device in the tank for raising the iron, said device being wholly within the tank and submerged in the water when in use, and means for revolving said device, substantially as described.

This specification signed and witnessed this 21st day of February, 1891.

WILLIAM ANDERSON.

Witnesses:
FRANCIS CRUMPTON MUNN,
HERBERT GELLATLY.